United States Patent
Mathon et al.

(10) Patent No.: US 9,517,581 B2
(45) Date of Patent: Dec. 13, 2016

(54) PRESSURE-MAINTENANCE DEVICE FOR PRODUCING COMPOSITE PARTS BY RESIN INJECTION AND ASSOCIATED METHOD

(71) Applicant: SNECMA, Paris (FR)

(72) Inventors: Richard Mathon, New Castle, NH (US); Antoine Phelippeau, Portsmouth, NH (US)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/356,922

(22) PCT Filed: Oct. 23, 2012

(86) PCT No.: PCT/FR2012/052420
§ 371 (c)(1),
(2) Date: May 8, 2014

(87) PCT Pub. No.: WO2013/068666
PCT Pub. Date: May 16, 2013

(65) Prior Publication Data
US 2014/0252692 A1    Sep. 11, 2014

Related U.S. Application Data

(60) Provisional application No. 61/557,124, filed on Nov. 8, 2011.

(51) Int. Cl.
*B29C 70/48* (2006.01)
*B29C 45/77* (2006.01)
*B29C 70/54* (2006.01)

(52) U.S. Cl.
CPC ............. *B29C 45/77* (2013.01); *B29C 70/48* (2013.01); *B29C 70/546* (2013.01)

(58) Field of Classification Search
CPC ... B29C 70/48; B29C 70/546; B29C 2045/468
See application file for complete search history.

(56) References Cited

U.S. PATENT DOCUMENTS 3,071,496 A * 1/1963 Fromm ................. H02K 15/12
                                                    264/102
3,154,618 A * 10/1964 Baer et al. ............. B29C 45/46
                                                    264/299

(Continued)

FOREIGN PATENT DOCUMENTS

EP      0 320 302      6/1989
FR      2 975 629      11/2012

(Continued)

OTHER PUBLICATIONS

Campbell, F C ED - Campbell Flake C: "Manufacturing processes for advanced composites, passage," Manufacturing Processes for Advanced Composites, Elsevier Advanced Technology, Jan. 1, 2004, ISBN: 978-1-85617-415-2, XP002565382, pp. 331-341.

(Continued)

*Primary Examiner* — Jill Heitbrink
(74) *Attorney, Agent, or Firm* — Pillsbury Winthrop Shaw Pittman LLP

(57) ABSTRACT

A pressure-maintenance device for a resin injection system including an injection network connected to an injection mould, includes a pressurisation device adapted to inject a pressurised gas into a channelling; a first connector adapted to be connected to the resin injection network and adapted to be connected to the channelling; a second connector adapted to be connected to the injection mould of the injection system; the first connector being connected to the second connector by a pressure-maintenance channelling adapted to receive the gas injected under pressure.

8 Claims, 1 Drawing Sheet

(56) References Cited

U.S. PATENT DOCUMENTS

| | | |
|---|---|---|
| 3,975,479 A | 8/1976 | McClean |
| 5,433,915 A | 7/1995 | Yamamoto et al. |
| 2002/0046596 A1 | 4/2002 | Zhang et al. |

FOREIGN PATENT DOCUMENTS

| | | | |
|---|---|---|---|
| GB | 944955 | * | 12/1963 |
| WO | WO 96/22871 | | 8/1996 |

OTHER PUBLICATIONS

International Search Report as issued for International Application No. PCT/FR2012/052420, dated Apr. 24, 2013.

* cited by examiner

PRESSURE-MAINTENANCE DEVICE FOR PRODUCING COMPOSITE PARTS BY RESIN INJECTION AND ASSOCIATED METHOD

CROSS REFERENCE TO RELATED APPLICATIONS

This application is the U.S. National Stage of PCT/FR2012/052420, filed Oct. 23, 2012, which in turn claims priority to U.S. Provisional Patent Application No. 61/557,124 filed Nov. 8, 2011, the entire contents of all applications are incorporated herein by reference in their entireties.

The present invention relates to a pressure-maintenance device for producing composite parts produced by RTM (resin transfer moulding) injection and to a method for producing a part from composite materials by RTM injection.

The invention is applicable in particular to the field of aeronautics.

The RTM method is a known method for producing parts from composite materials (fibre/resin) having a high ratio of strength to mass. The RTM method conventionally includes the following basic procedures:
preparation of a preform of fibres by weaving;
arrangement of the preform in an injection mould;
injection of the resin in the liquid state;
application of a holding pressure to the injected resin and polymerisation of the part by heating.

The resins used are very fluid so as to easily penetrate between the different fibres of the preform, even if they are injected at a reduced pressure. During the polymerisation under the effect of the heat, the injected resin passes in succession from the liquid state to the gelified state and lastly into the solid state.

So as to ensure quality parts which have no faults and no porosity, in particular caused by degassing of the resin during polymerisation, it is necessary to maintain the holding pressure until complete polymerisation of the part.

In the known RTM injection systems the pressurisation is ensured by the resin injector. It is thus necessary to hold the injector in place and to maintain a pressure until the resin has congealed completely. These RTM injection systems thus do not allow production of parts at high output rates, since the immobilisation time of the injector is linked to that of polymerisation of the resin. The implementation times of the production means are thus significant and cannot be reduced.

Moreover, the holding in place of the injection device until complete polymerisation of the part increases the risk of polymerisation of the resin inside the injection device and inside the channellings located between the injection device and the mould, which complicates cleaning of the injection device.

Lastly, with use of a heat chamber as a heating means, the resin contained in the channelling formed between the injection device and the mould may be polymerised before the resin contained in the mould, of which the resin thickness is greater. This congealing in the channelling thus no longer ensures the transfer of the holding pressure to the mould, which results in the presence of porosity in the part.

A pressure-maintenance device described in patent application FR1154662 has been developed and makes it possible to avoid polymerisation of the resin inside the injector during the phase of maintained pressurisation of the preform. The document proposes using a flexible membrane which is integrated in the injection equipment or positioned outside the equipment in a specific module so as to ensure the pressurisation of the injection system instead of the injector.

However, the solution proposed in this patent application requires the manufacture of specific equipment, separate from the injection equipment, or the modification of the injection equipment for integration of the pressure-maintenance device. Moreover, the proposed solution requires time to prepare the subsequent injection channelling network, which makes the proposed solution less economical.

Based on this, the invention aims to propose a pressure-maintenance device for producing parts from composite materials by RTM injection, said device making it possible to produce, economically and quickly by RTM injection, composite parts which have no porosities.

To this end, the invention proposes a pressure-maintenance device for a resin injection system comprising an injection network connected to an injection mould, characterised in that said device comprises:
pressurisation means adapted to inject a pressurised gas into a channelling;
a first connection means adapted to be connected to said resin injection network and adapted to be connected to said channelling;
a second connection means adapted to be connected to said injection mould of said injection system:
said first connection means being connected to said second connection means by a pressure-maintenance channelling adapted to receive said gas injected under pressure.

Thanks to the device according to the invention it is no longer necessary to exert a holding pressure in the resin injection system via the injector. The injector is thus released from the end of the injection process, which makes it possible to avoid polymerisation of the resin inside said injector during the pressure-maintenance phase. The implementation time of the injector is also reduced, which makes it possible to increase the production rate for such an injector.

The pressure-maintenance device according to the invention may also have one or more of the features below, considered individually or in any technically feasible combination:
said first connection means and said second connection means are arranged so that the longitudinal axis of said pressure-maintenance channelling is vertical;
the diameter of said pressure-maintenance channelling is at least twice as large as the diameter of a channelling of said resin injection network;
said pressure-maintenance device comprises a pressure sensor.

The invention also relates to a resin injection system which is able to produce parts from composite materials and comprises:
a resin injector;
an injection mould comprising a cavity able to receive a woven preform;
a resin injection network formed by a resin inlet channelling connecting the resin injector and said injection mould, and a resin outlet channelling able to discharge the excess resin injected into said cavity:
a pressure-maintenance device according to the invention;
means for producing the vacuum in said injection system.

In accordance with a specific embodiment of the invention, said pressure-maintenance device is positioned on said resin inlet channelling or on said resin outlet channelling of said injection mould.

In accordance with a specific embodiment of the invention, the injection system comprises a first pressure-maintenance device positioned on said resin inlet channelling and a second pressure-maintenance device positioned on said resin outlet channelling.

In accordance with a specific embodiment of the invention, said pressure-maintenance device and/or said resin inlet channelling and/or said resin outlet channelling are insulated.

The invention also relates to a method for injecting resin by RTM carried out by means of an injection system according to the invention, characterised in that said method comprises the following steps:
 placing under vacuum said resin injection network, formed at least by said resin inlet channelling, said resin outlet channelling and said cavity of said injection mould, via said means able to produce the vacuum in the injection system;
 injecting the resin in the liquid state into the injection network by means of said injector so as to reach a setpoint pressure inside said injection mould:
 applying a holding pressure in the injection network by means of said pressure-maintenance device until polymerisation of said resin.

Further features and advantages of the invention will become clearer from the description below, which is provided by way of example and is in no way limiting, given with reference to the accompanying drawings, in which.

Like elements are denoted by like reference numerals in all the figures, unless indicated otherwise.

Generally speaking, solid arrows indicate the direction of migration of the resin inside the injection system 100, and dashed arrows indicate the direction of circulation of the gas.

Figure 1:
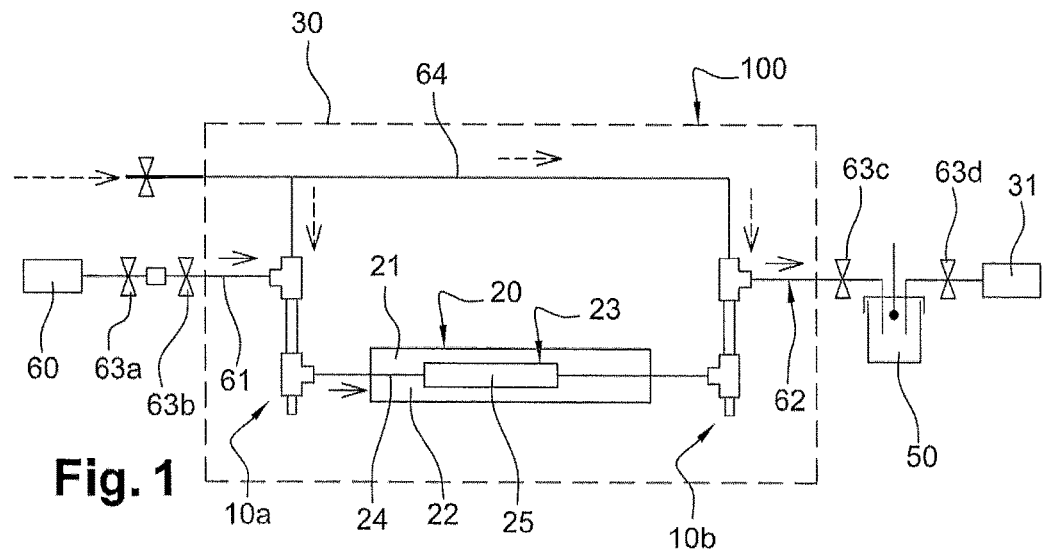
FIG. 1 is a schematic view illustrating an embodiment of an RTM injection system incorporating the pressure-maintenance devices according to the invention.

FIG. 1 is a schematic view illustrating an embodiment of an RTM injection system 100 incorporating two pressure-maintenance devices 10a and 10b according to the invention.

The system 100 comprises conventional elements making it possible to produce a part from composite materials by RTM injection. To this end, the system 100 comprises:
 a resin injector 60;
 an injection mould 20 in two portions formed by an upper portion 21 and a lower portion 22, separated by a joining surface 24 and comprising a cavity 23 in the shape of the part to be produced and in which a woven preform 25 is inserted;
 a resin trap 50;
 an injection channelling 61 connecting the injector 60 to the injection mould 20;
 a resin outlet channelling 62 connecting the injection mould 20 to the resin trap 50;
 means 31 for producing the vacuum in the injection system 100;
 opening/closing valves 63a, 63b, 63c, 63d making it possible to control the opening or closing of the different channellings 61, 62 of the system 100;
 means 30 for heating the injection mould 20, such as a heat chamber, or a hot press (not shown) so as to polymerise the resin.

The production of a part from composite materials by RTM is thus conventionally broken down into a plurality of subsequent steps as follows:
 preparing the injection mould 20 by applying a mould-release agent;
 preparing a preform of fibres 25 produced previously by weaving;
 placing the woven preform 25 in the cavity 23 of the injection mould 20;
 closing the injection mould 20 and preparing the injection channelling 61 and the resin outlet channelling 62;
 heating the injection mould 20 in a heat chamber or hot press:
 placing under vacuum the network of channellings 61, 62 as well as the cavity 23 of the injection mould 20 by the means 31 able to produce the vacuum in the injection system 100;
 injecting the resin in the liquid state into the injection channelling 61 by means of the injector 60 so that the resin migrates into the injection channelling 61 towards the cavity 23 of the injection mould 20 and then towards the resin outlet channelling 62 when the cavity 23 is full, the excess of injected resin being recovered in the resin trap 50; the woven preform is thus impregnated by resin;
 applying a holding pressure to the injected resin once the cavity 23 is full until polymerisation of the resin so as to continue the impregnation of the woven preform 25 and to reduce the porosity of the part;
 removing from the mould the part produced.

The injection system 100 illustrated in FIG. 1 also comprises two pressure-maintenance devices 10a and 10b arranged on either side of the injection mould 20. The devices 10a, 10b according to the invention make it possible to apply a holding pressure to the resin, which is necessary to produce a quality part.

In accordance with another embodiment (not shown), the injection system may comprise a single pressure-maintenance device according to the invention positioned upstream or downstream of the injection mould 20. In accordance with the embodiment illustrated in FIG. 1, the pressure-maintenance devices 10a and 10b are respectively positioned on the injection channelling 61 upstream of the injection mould 20 and on the resin outlet channelling 62 downstream of the injection mould 20.

In accordance with the embodiment illustrated in FIG. 1, the pressure-maintenance devices 10a and 10b are advantageously placed in the heat chamber 30 and are arranged close to the injection mould 20; however, the devices 10a and 10b may also be placed outside the means 30 for heating the injection mould if the heating means are formed by a hot press.

The pressure-maintenance devices 10a and 10b are advantageously positioned as close as possible to the inlet and outlet of the injection mould 20.

The pressure-maintenance devices 10a and 10b are also connected, by means of the channelling 64, to the means able to inject pressurised gas (advantageously air or a neutral gas) into the channelling 64.

Figure 2:
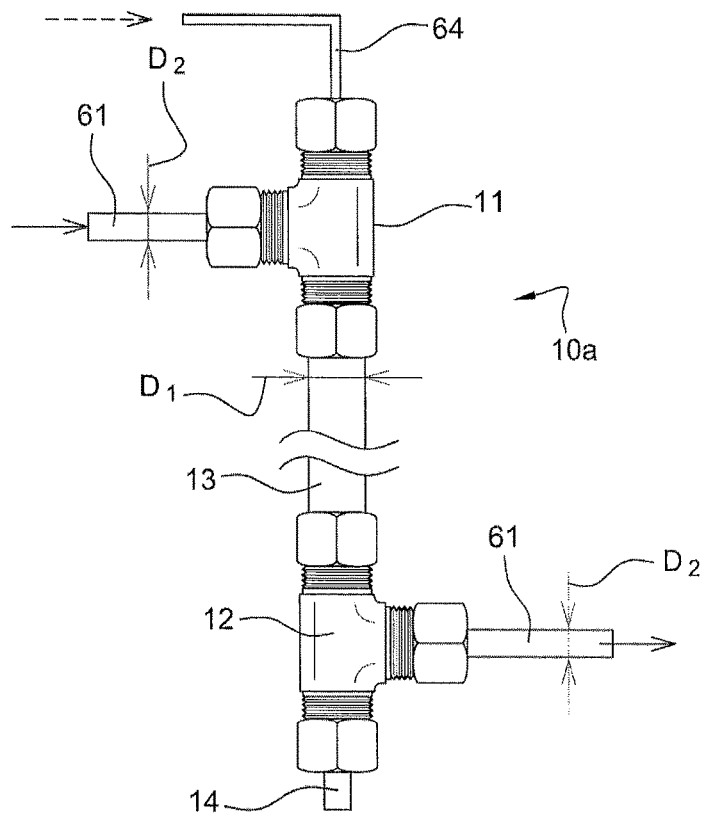
FIG. 2 is a schematic view of an embodiment of the pressure-maintenance device according to the invention illustrated in FIG. 1.

The pressure-maintenance device 10a according to the invention is illustrated in greater detail in FIG. 2.

The pressure-maintenance device 10a is formed by a first T-connection 11 and by a second T-connection 12, the two Ts being connected by a channelling 13 which is adapted to be pressurised.

The first T-connection 11 of the device 10 is connected to the portion of the injection channelling 61 connected to the injector 60 and to the means able to inject pressurised gas via the channelling 64.

The second T-connection 12 of the device 10 is connected to the portion of the injection channelling 61 connected to the injection mould 20 and comprises a pressure sensor 14 which makes it possible in particular to detect the onset of polymerisation in the injection mould 20.

The T-connections 11 and 12 are advantageously positioned in the injection system 100 so that the longitudinal axis of the channelling 13 connecting the two Ts 11, 12 is positioned vertically (that is to say along an axis parallel to the direction of gravity). During the pressurisation of the injection network (that is to say the assembly formed by the injection channelling 61, by the devices 10a, 10b, the cavity 23 of the injection mould 20, and the resin outlet channelling 62) by the means able to inject gas into the channelling 64, the pressurised gas arrives via the upper portion of the T 11, pressurising the resin contained in the channelling 13 so as to transfer the pressure to the preform 25. As a result; the resin contained in the channelling 13 is pushed vertically by the pressurised gas towards the injection mould 20. The vertical position of the channelling 13 makes it possible to avoid a migration of the pressurised gas through the resin, which would cause porosities in the composite part.

The volume of the channelling 13 is adapted to the volume of the preform 25 so as to prevent the channelling 13 from emptying in the event of residual filling of the preform during the step of maintaining pressurisation of the resin, which would cause porosities in the composite part.

The diameter D1 of the channelling 13 is advantageously at least twice as large as the diameter D2 of the injection channelling 61 (resin inlet into the injection mould 20).

The device 10b is identical to the device 10a described above. The device 10b differs from the device 10a in that the upper T is connected to the portion of the resin outlet channelling 62 connected to the resin trap 50, and in that the lower T 12 is connected to the portion of the injection channelling 62 connected to the outlet of the injection mould 20, In accordance with the embodiment illustrated in FIG. 1, the pressurisation of the injection network at the entry point of the resin into the injection mould 20 and at the exit point of the resin from the injection mould 20 thus makes it possible to produce optimised maintained pressurisation of the preform until polymerisation begins. This embodiment makes it possible to avoid any loss of the maintained pressurisation of the injection network caused by the onset of polymerisation in a portion of the injection network (upstream or downstream of the injection mould 20).

However, it is also envisaged to use a single pressure-maintenance device according to the invention to pressurise the injection system 100.

The connection Ts 11, 12 advantageously comprise means making it possible to quickly connect and disconnect the channellings 61, 62, 64.

The use of the pressure-maintenance device according to the invention modifies some of the steps of the known RTM injection method described above.

Thus, at the end of the step of injection of the resin into the injection network, a period of maintained pressurisation by the injector must be observed so as to ensure the residual filling of the preform 25. Once the period of maintained pressurisation by the injector (which is variable depending on the volume of the cavity 23 and of the preform 25) has elapsed, the network is pressurised by the injection of pressurised gas into the network via the pressurisation channellings 13.

As soon as the injection network has been pressurised by the channellings 13, the injector 60 can be disconnected from the network by closing the valves 63a, 63b and can thus be easily cleaned since the resin has not yet polymerised. It is thus possible to use the same injector to inject resin into a second injection system, which is parallel to the first, whilst polymerisation of the part from the first system is still incomplete.

So as to delay the congealing of the resin and to make it possible to transfer the pressure into the injection mould for as long as possible, the pressure-maintenance device 10 and/or the channellings 61, 62 of the injection network are completely insulated.

In the case of heating in a heat chamber, this will thus allow the resin to avoid polymerising in the pressure-maintenance devices 10a, 10b and in the portions of the channellings 61, 62 connected to the injection mould during the increase in temperature.

In the case of injection in a press, this will make it possible to avoid solidification or thickening of the resin by cooling upon contact with the air in the device 10 and in the channellings 61, 62.

The other advantages of the invention are in particular as follows:
- rapid implementation of the pressure-maintenance device according to the invention;
- reduced production cost, which makes it possible to use a pressurisation function to manufacture the prototype part.

The invention claimed is:

1. A resin injection system able to produce parts from composite materials, said system comprising:
    a resin injector;
    an injection mould comprising a cavity able to receive a woven preform;
    a resin injection network formed by a resin inlet channelling connecting the resin
    injector and said injection mould, and a resin outlet channelling able to discharge
    the excess resin injected into said cavity;
    a pressure-maintenance device for the resin injection system, said pressure-maintenance device comprising
        a pressurisation device adapted to inject a pressurised gas into a channelling;
        a first connector adapted to be connected to said resin injection network and adapted to be connected to said channelling;
        a second connector adapted to be connected to said injection mould,
        said first connector being connected to said second connector by a pressure-maintenance channelling adapted to receive said gas injected under pressure, and
    a vacuum generator for producing the vacuum in said injection system.

2. The resin injection system according to claim 1, wherein said first connector and said second connector are arranged so that a longitudinal axis of said pressure-maintenance channelling is vertical.

3. The resin injection system according to claim 1, wherein a diameter of said pressure-maintenance channelling is at least twice as large as a diameter of a resin channelling connected to said resin injection network.

4. The resin injection system according to claim 1, wherein said pressure-maintenance device comprises a pressure sensor.

5. The resin injection system according to claim 1, wherein said pressure-maintenance device is positioned on said resin inlet channelling or on said resin outlet channelling of said injection mould.

6. The resin injection system according to claim 1, comprising a first pressure-maintenance device positioned on said resin inlet channelling and a second pressure-maintenance device positioned on said resin outlet channelling.

7. The resin injection system according to claim 1, wherein said pressure-maintenance device and/or said resin inlet channelling and/or said resin outlet channelling are insulated.

8. A method for injecting resin by RTM implemented using an injection system according to claim 1, comprising:
- placing under vacuum said resin injection network, formed at least by said resin inlet channelling, said resin outlet channelling and said cavity of said injection mould, via said vacuum generator able to produce the vacuum in the injection system;
- injecting the resin in the liquid state into the injection network using said injector so as to reach a setpoint pressure inside said injection mould, and
- applying a holding pressure in the injection network using said pressure-maintenance device until polymerisation of said resin.

* * * * *